United States Patent [19]
Tripp

[11] Patent Number: 5,285,616
[45] Date of Patent: Feb. 15, 1994

[54] I-BEAM STRUCTURE

[76] Inventor: Benjamin A. Tripp, R.R. #2, Orangeville, Ontario, Canada, L9W 2Y9

[21] Appl. No.: 64,910

[22] Filed: May 24, 1993

Related U.S. Application Data

[63] Continuation-in-part of Ser. No. 37,385, Mar. 26, 1993, which is a continuation-in-part of Ser. No. 750,936, Aug. 28, 1991, abandoned.

[51] Int. Cl.⁵ .............................................. E04C 3/30
[52] U.S. Cl. .................... 52/729; 52/DIG. 9
[58] Field of Search ............... 52/729, DIG. 9, 730.1; 29/403.1, 401.1

[56] References Cited

U.S. PATENT DOCUMENTS

| 3,349,537 | 10/1967 | Hopfeld | 52/729 |
| 4,843,777 | 7/1989 | Shimabukuro | 52/729 |
| 5,172,528 | 12/1992 | Clarke | 52/DIG. 9 |
| 5,214,896 | 6/1993 | Hamilton | 52/DIG. 9 |

Primary Examiner—Carl D. Friedman
Assistant Examiner—Kien Nguyen
Attorney, Agent, or Firm—Ridout & Maybee

[57] ABSTRACT

An I-beam structure is made from discarded tire belts wherein the beam web is constructed from two car or truck tire belts joined centrally along their lengths tread to tread. Flange members are made of a two ply laminated structural material wherein each ply is a continuous car tire belt, and the two plies are bonded tread to tread along their lengths The two ply flange forming members are attached to the web by adhesive or vulcanization bonding.

13 Claims, 5 Drawing Sheets

I-BEAM STRUCTURE

This application is a continuation-in-part of pending U.S. Ser. No. 08/037-385 filed Mar. 26, 1993, which is a continuation-in-part of U.S. Ser. No. 07/750,936 filed Aug. 28, 1991, which is abandoned.

The invention is an I-beam structure formed from used car and truck tire belts.

Discarded vehicle tires pose a significant environmental hazard, yet there has been no economic means for utilizing such tires so that recycling them would be encouraged. Secondary uses for discarded vehicle tires must compete economically with manufacturing using raw materials. Currently, raw materials have a low price in relation to the cost of reprocessed or recycled materials. This fact is the central challenge facing the recycling industry, and is nowhere more apparent than in relation to the recycling of vehicle tires.

The reinforced belt of a vehicle tire possesses great strength and potentially may be useful as a substrate for the manufacture of other useful products. Others have recognized this principle but have failed to solve the problem of economically, i.e. profitably, manufacturing products from used tires, or to solve the problem of manufacturing products having market acceptance, or both. The economic problem centers around the perception in the art that used vehicle tires require a fair amount of processing to provide a material which is suitable for use in further manufacturing. Thus, prior uses of tire belts have involved processing tires to remove their sidewalls and treads yielding more or less uniform belts which are used as building blocks in the manufacture of products. These prior belts are relatively costly to produce as the step of tread removal is controlling in establishing the cost of the substrate belt material used in the subsequent manufacturing. The product acceptance problem stems from the use of belts formed from individual tires as building blocks for manufacturing secondary products. In order to provide such products with sufficient stiffness, three or more layers, or plies, of belts must be used. The resulting thickness usually provides a product which is too bulky and heavy as compared to a product made from raw materials. Obviously, the use of three or four plies to make a product costs more than the use of two plies. Thus, market acceptance of such products is lacking.

Unless otherwise specified, as used herein, the term "belt" or "tire belt" means a plurality of individual automobile or light truck tires having their sidewalls removed, being cut transversely to form strips and being joined together end to end to form a continuous elongate member with one side having a tread surface. The term "individual belt" means a belt portion formed from a single tire.

A preferred embodiment of the present invention utilizes a two ply laminated structural material made from two tire belts adhered together tread surface to tread surface and two individual truck tire belts to make a novel I-beam structure. The I-beam structure of the invention possesses strength, weight and energy absorbing characteristics which make it attractive for uses such as dock beams, fence posts, deck joists and highway guide rail posts. Importantly, the invention provides a secondary use for highly durable waste truck tires.

Accordingly, the invention is an I-beam structure comprising a web and two flange members. The web is formed from two individual tire belts, preferably from two individual truck tire belts which are attached together tread surface to tread surface centrally along their lengths. The web has longitudinal side portions capable of being bonded to the flange members. The flange members are made of a two ply laminated structural material which is made from two tire belts adhered together tread surface to tread surface.

BRIEF DESCRIPTION OF THE DRAWINGS

As shown in FIG. 1, a used vehicle tire is processed to remove its sidewalls 10, for example, by cutting them off, and then the remaining annular portion 12 is cut transversely at 13 to form an individual belt 14. A plurality of individual belts 14 are joined in end to end relation to provide a belt 16 for use in making the two ply structural material used in the invention. Steel belt reinforced tires, such as steel belted radial tires, are particularly useful for making the belts 16, but the belts 16 can be made from all types of vehicles tires.

As shown in FIGS. 2-5, various means can be used to join individual belt pieces 14 to form a belt 16. In FIG. 2, the annular tire portion 12 is cut at 13 on an angle to give bevelled ends which allow an overlapping end to end joint to be made between individual belts 14. The end to end connection of individual belts 14 is made using adhesive or by vulcanization 18 and may be reinforced with mechanical fasteners such as staples 20 or screws 21. The belt 16 is constructed so that the tread surface 23 is continuous along one side of its length.

Figure 1:
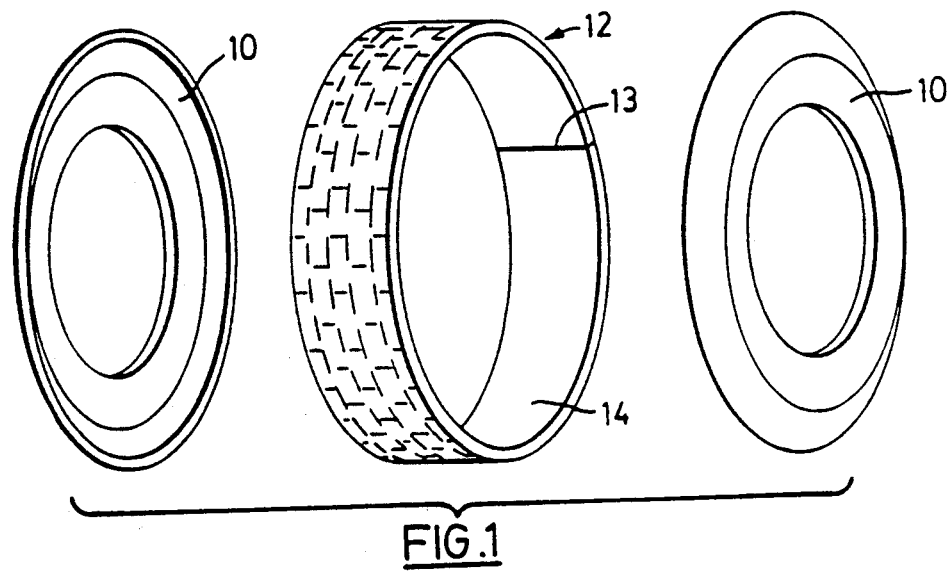
FIG. 1 is an exploded perspective view of a vehicle tire showing the production of an individual belt.
Figure 2:
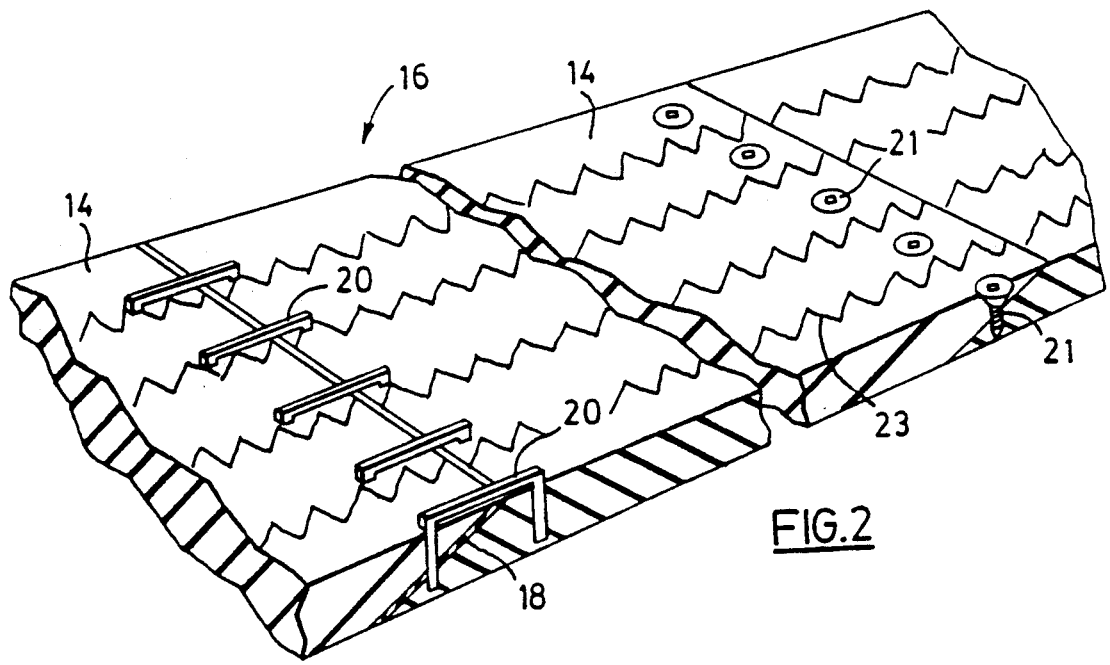
FIGS. 2-5 are perspective views showing various methods of connecting individual belts in end to end relation.
Figure 3:
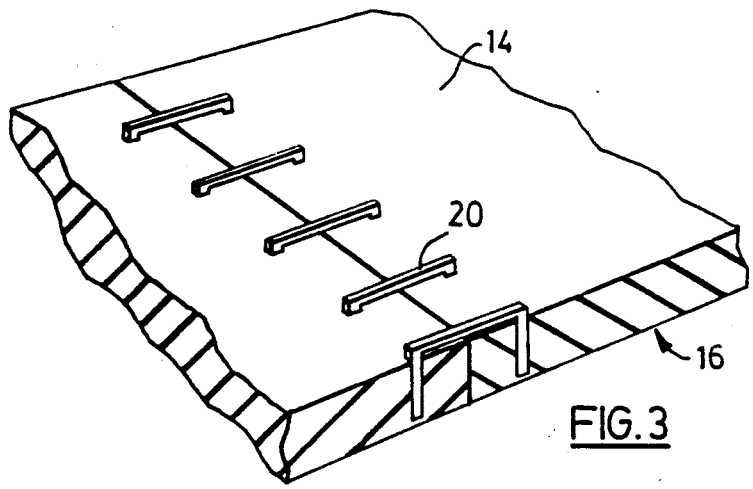
Figure 4:
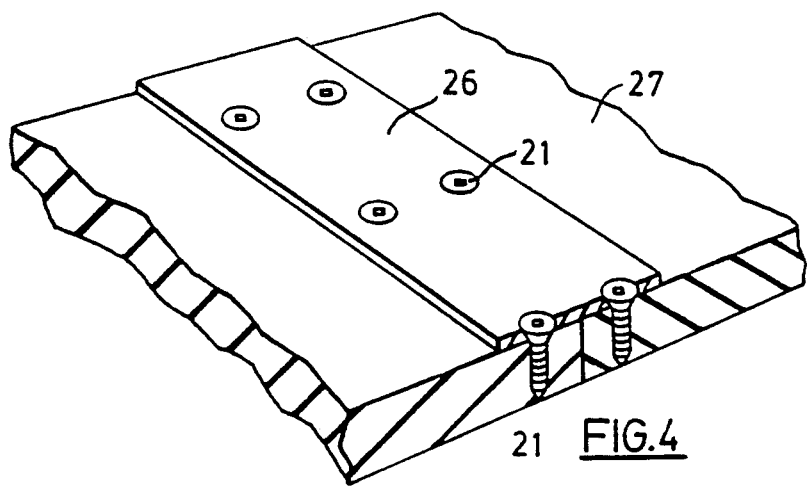
Figure 5:
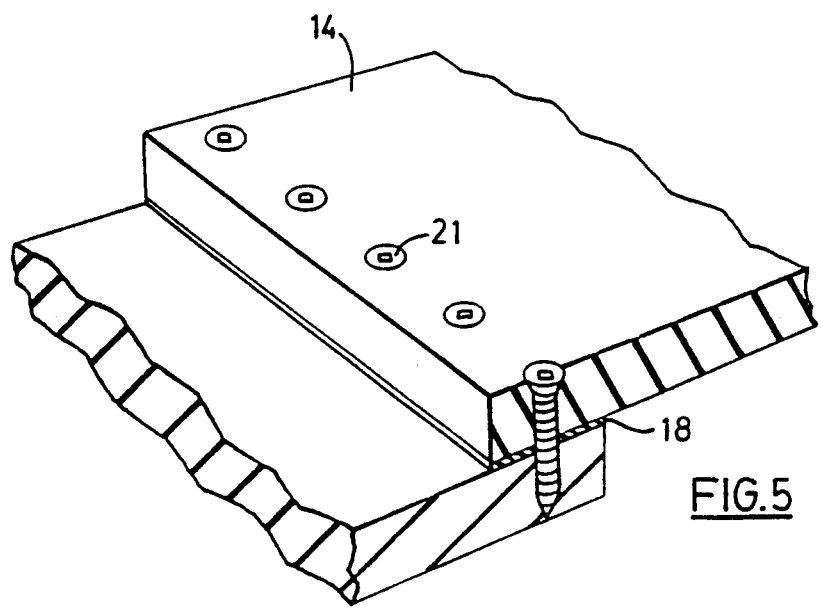

Various other means of end to end connection of individual belts 14 to form a belt 16 may be used, and several such possible means are shown in FIGS. 3-5. Thus, belt portions 14 can simply be stapled together (FIG. 3). A metal plate 26 can be secured across a joint using screws 21 as shown in FIG. 4. In this case, the plate 26 should be located on the non-tread side 27 of the belt 16. A simple overlapping joint (FIG. 5) secured by adhesive or vulcanization 18, preferably reinforced by mechanical means such as by screws 21, is also suitable for the purposes of the invention. A preferred method of making a composite belt 16 is described and claimed in copending application U.S. Ser. No. 08/025787 filed Mar. 3, 1993.

The important aspect of forming the end to end joints between belt portions 14 is that such joints are of sufficient strength to allow the resultant belt 16 to carry a load in tension longitudinally. The tension load which the belt 16 must be able to carry need be no greater than about 10% of the tension load capability of an individual tire belt 14. The belt 16 must have structural continuity, and in this regard, the capability of the belt 16 to carry a load in tension is essential.

A two ply laminate 40 is made by adhering two belts 16 together. The lamination may be effected with adhesive or by vulcanization. Since each belt 16 has a tread surface which forms a good bond, and an inner tire surface 27 which poorly bonds with adhesive or rubber, the laminate of the invention preferably is formed by bonding the tread surfaces 23 of opposing belts 16 to one another. By bonding opposing tread surfaces 23 together, a laminate 40 is formed having a bond between the plies which approximates the strength of the rubber of each ply. Also, the tread to tread bonding spaces the reinforcing materials of each belt 16 as far apart as possible, thereby affording the laminate 40 the maximum stiffness which the belts 16 can provide.

Prior tire belt laminate material was constructed from individual tire belts 14 with the tread surface 23 being removed. These prior materials were not structurally viable in the form of a two ply laminate because they were incapable of carrying a bending load. By using structurally continuous belts 16 to form a two ply laminate material, structural integrity of the material is achieved. The two ply laminate 40 of the invention can carry a bending load in any direction without failing, i.e., breaking, delaminating or separating between end to end joints of the belts 16. The material can also carry loads in shear, tension or compression anywhere along its length. The material of the invention is a structurally viable substrate for the production of a variety of products.

Figure 6:
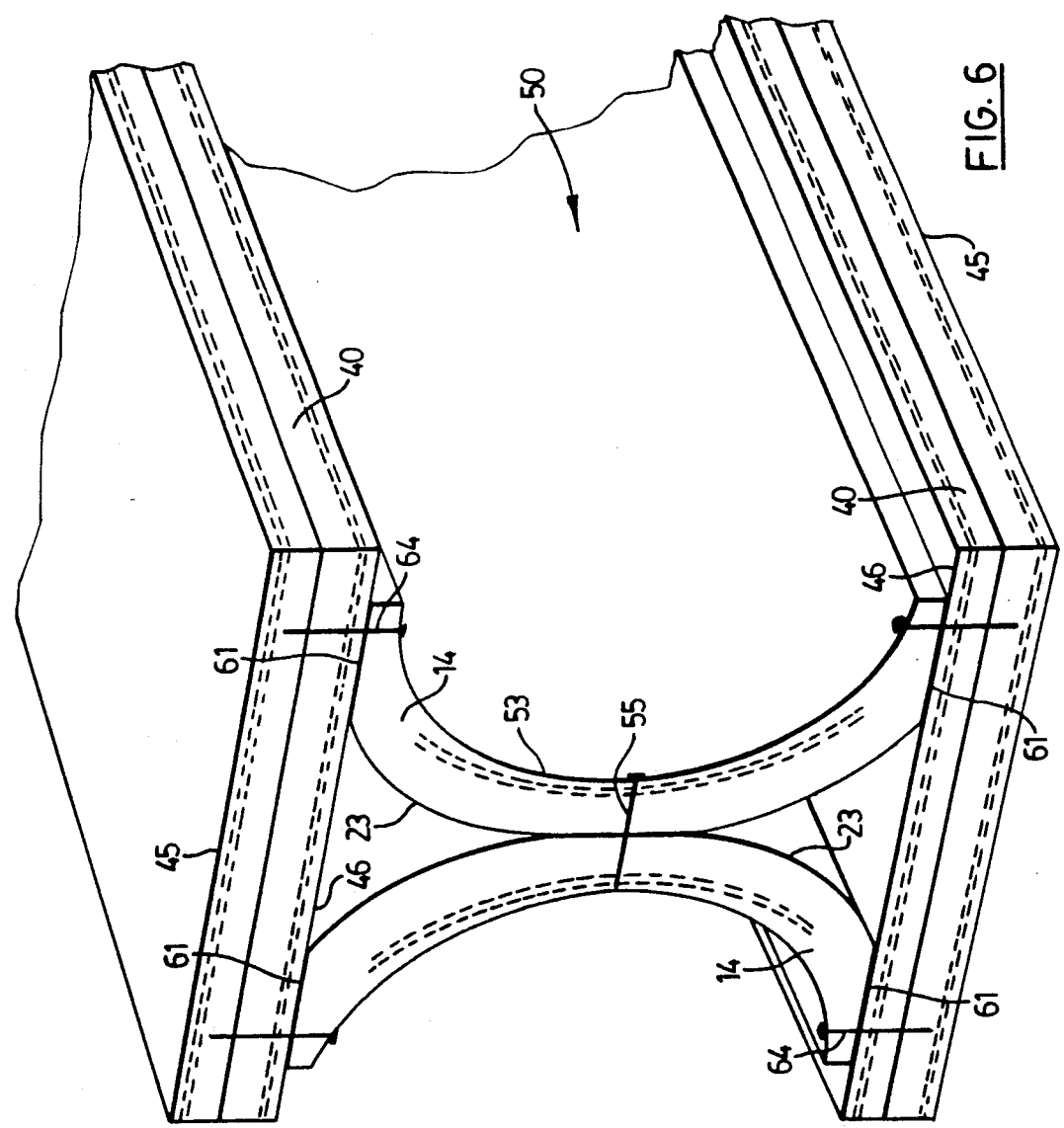
FIG. 6 is a perspective view of an I-beam of the invention.

In accordance with the present invention, the two ply laminate material 40 may be used as flange forming members 45 for the I-beam structure 50 (FIG. 6). The web 53 is two individual tire belts 14 attached together tread surface 23 to tread surface 23 centrally along their lengths. For the belts 14 forming the web 53, the preferred means of attachment is by bonding with adhesive or by vulcanization. The bonding may be reinforced with mechanical fastening means 55 such as screws or staples. The web 53 has longitudinal sides 61 which provide surfaces for adhesive attachment to the flange forming members 45. The substantially flat sides 61 are formed by cutting or planing the belts 14 either before or after they are joined together. The bonding of the flange members 45 to the web sides 61 may be effected using adhesive or vulcanization. In either instance, the surface 46 of the flange member 45 to be bonded to the side 61 should be slightly abraded, for example, by sand blasting or by working the surface 46 with a wire brush. The surface 46 represents the inner surface of a tire which has been treated in the tire making process so that it does not provide a good surface for bonding for the purposes of the present invention. Thus, preparation of the surface 46 is needed to enable the formation of a strong bond between the two ply material 40 and the web sides 61. The attachment of the flange members 45 to the sides 61 may be reinforced using mechanical fastening means such as screws 64.

To provide the I-beam 50 with sufficient stiffness in compression transversely of the web 53, each pair of side surfaces 61 are spaced apart for attachment to the respective flange member 45. This generally triangular arrangement in cross section (FIG. 6) provides the beam 50 with sufficient structural stiffness to render it suitable for a variety of uses. The I-beam 50 thus formed has a length of from five to seven feet depending on the size of vehicle tire used to form the belts 14. Longer beams 50 may be made using the continuous two ply flange material 40 without necessarily connecting the web belts 14 end to end. As long as there is a reasonable offset in the end to end positions of the two web sections 53 comprising the longer beam 50, the shear load at the interface may be carried by the two ply flange material 40. Clearly, end to end connection of two abutting web portions 53 may be accomplished using connecting means such as metal plates or short pieces of belt 14.

Figure 7:
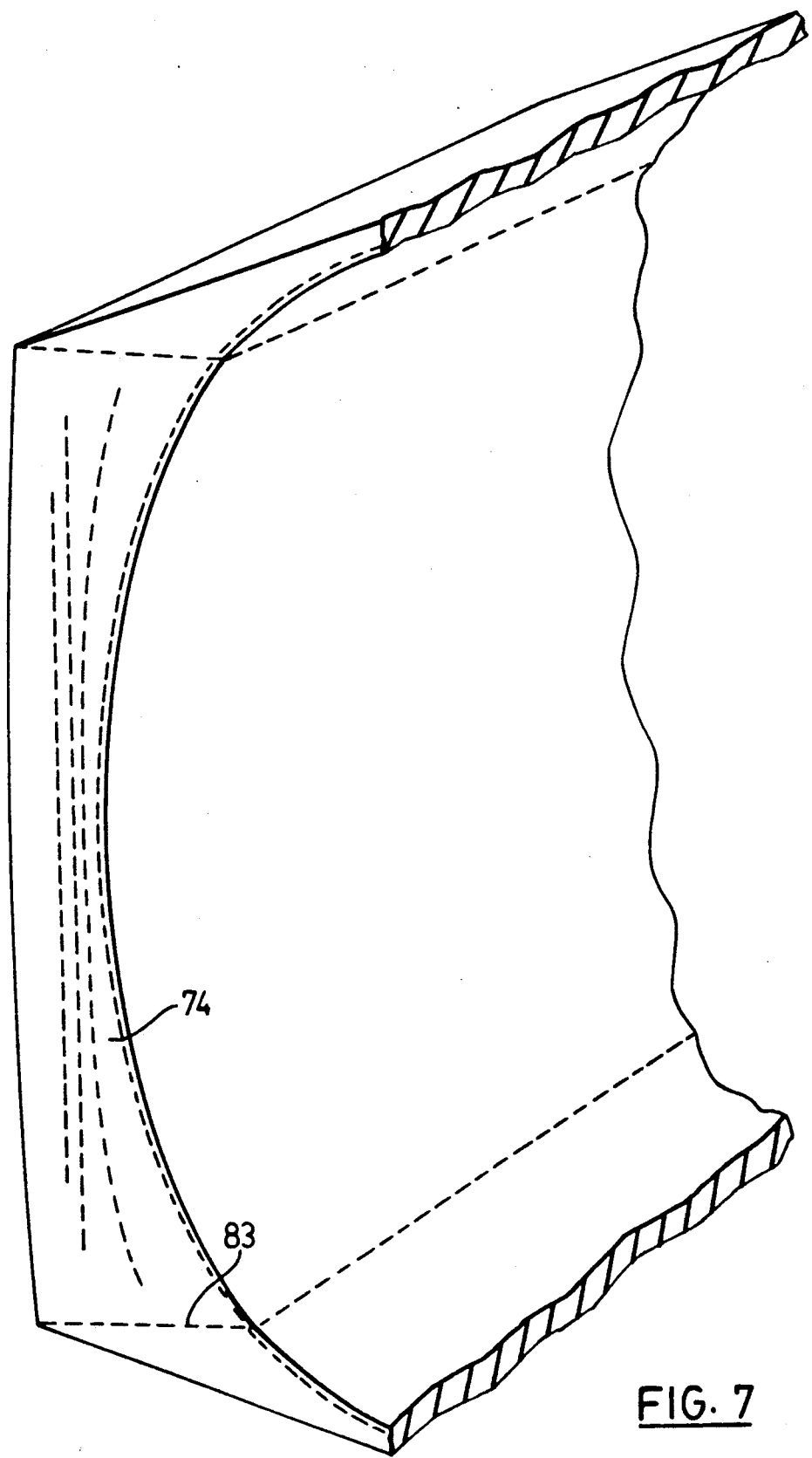
FIG. 7 is a perspective view of a truck tire belt used to form the web of a beam of the invention.
Figure 8:
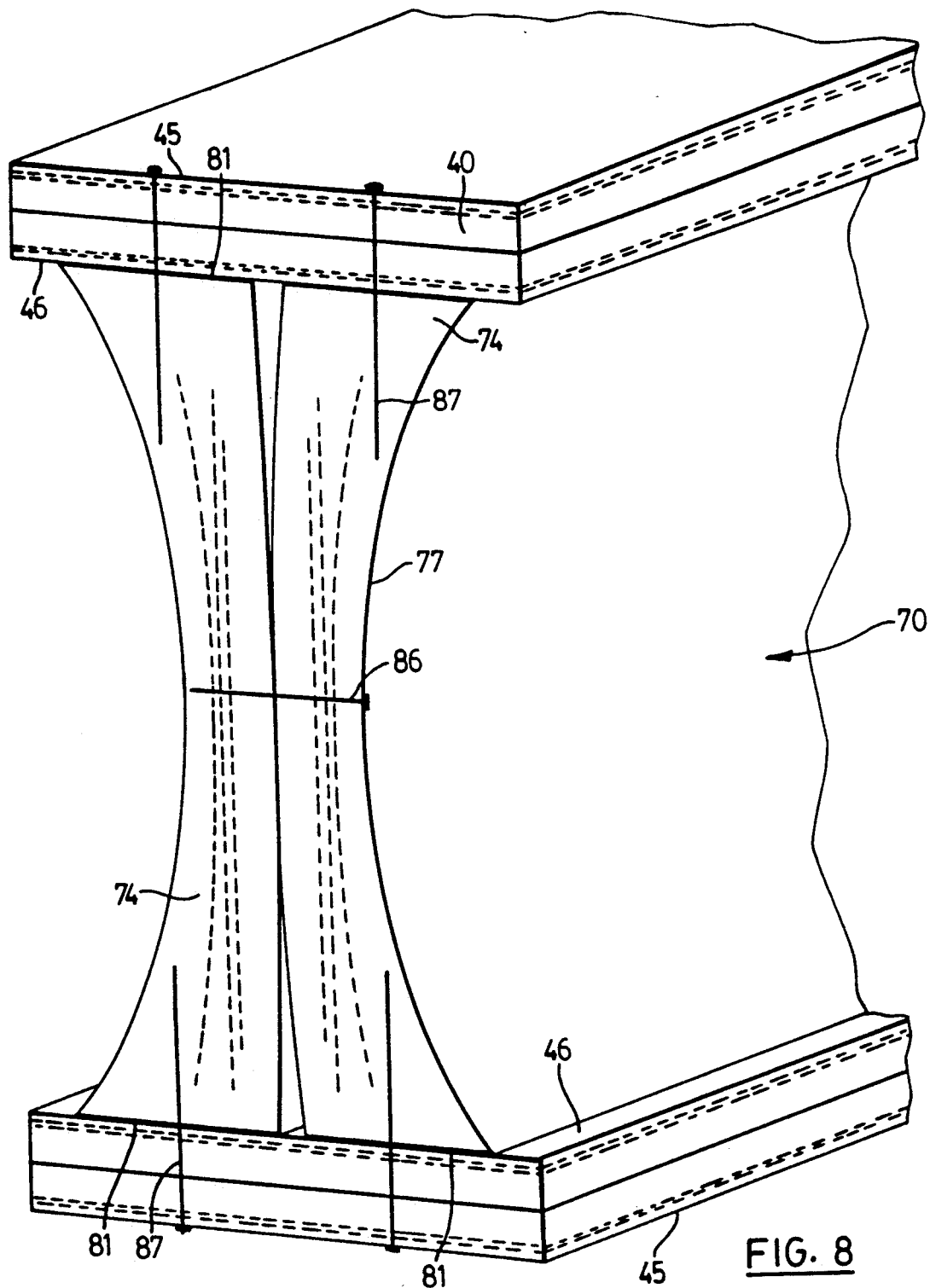
FIG. 8 is a perspective view of another I-beam of the invention.

A particularly preferred I-beam structure 70 of the invention is illustrated in FIGS. 7 and 8, wherein individual truck tire belts 74 are used to form a web 77 for the beam 70. Truck tires are significantly heavier, stiffer and generally more robust than automobile and light truck tires. The physical characteristics of truck tires pose significant challenges to those seeking to use discarded truck tires as substrates for the manufacture of structural products. The present invention makes use of the stiffness and strength of truck tire belts 74 to provide webs 77 for I-beams 70.

A truck tire belt 74 is made as usual by removing sidewalls from a truck tire and cutting the annular belt transversely to provide an elongate strip of belt 74 (FIG. 7). Substantially flat side surfaces 81 are provided for the belt 74 by removing additional material along each side of the belt 74 by, for example, cutting at line 83.

The web 77 is formed from two individual truck tire belts 74 joined centrally tread to tread along their lengths. The belts 74 are preferably joined using mechanical means 86, such as staples or screws. While the belts 74 may also be bonded together centrally along their lengths using adhesive or vulcanization, bonding is not needed to provide a web 77 having sufficient stiffness and strength for essentially all expected applications.

As described in relation to the making of the I-beam 50, the beam 70 is provided with flange members 45 preferably made from the two ply material 40. The flange members 45 are attached to the web 77 using adhesive or vulcanization after first abrading the surface 46 of the material 40 to insure the formation of a good bond between the sides 81 and the surfaces 46 of the material 40. Again, the attachment of the flange members 45 may be reinforced using mechanical fasteners such as screws 87.

The I-beams 70 of the invention have a finished length of from about seven to about eleven feet, depending on the size of tires used. While greater lengths for the beam 70 are possible in the same manner as described for the beam 50, such longer beams 70 are not generally practical for most intended uses. A ten foot I-beam 70 has a manageable weight, whereas a beam 70 of twenty feet would require heavy equipment to move it.

The I-beams 50 and 70 of the invention will not rot or degrade in wet locations. The beams are insect and rodent proof. Because they are made of rubber, the beams 50 and 70 absorb impact loads and highly stressed but slowly applied loads will not cause catastrophic failure. For construction purposes, the beams 50 and 70 readily accept fasteners such as screws. Accordingly, the beams 50 and 70 can be used in the construction of docks or decks, as fence posts or guide rail posts and for many other applications.

I claim:

1. An I-beam structure, comprising:
    a web formed from two tire belts attached together tread surface to tread surface centrally along their lengths, the web having longitudinal side portions capable of being bonded to flange forming members; and
    first and second flange forming members of a two ply laminated structural material, comprising a first continuous ply of used vehicle tire belt consisting of a plurality of tread bearing tire belts from individual tires joined end to end so that the continuous ply is capable of carrying a load in tension which is at least 10% of the magnitude of a load in tension which an individual tire belt can carry; and a second continuous ply of used vehicle tire belt like the first continuous ply, wherein the first and second plies are bonded together tread surface to tread surface so that the resulting two ply laminated material is capable of carrying a bending, a shear, a tension, or a compression load anywhere along its length;

said first and second flange forming members being bonded to the longitudinal side portions of the web to make an I-beam structure.

2. An I-beam structure as claimed in claim 1, wherein the web is formed from two tire belts bonded together with adhesive or by vulcanization.

3. An I-beam structure as claimed in claim 2, wherein the bonding of the two tire belts forming the web is reinforced with mechanical fasteners.

4. An I-beam structure as claimed in claim 1, wherein the first and second flange forming members have surfaces for bonding to the side portions of the web, said surfaces being abraded prior to bonding to the web.

5. An I-beam structure as claimed in claim 1, wherein the bonding of the flange forming members to the side portions of the web is accomplished by adhesive or vulcanization.

6. An I-beam structure as claimed in claim 5, wherein the bonding of the flange forming members to the side portions of the web is reinforced with mechanical fasteners.

7. An I-beam structure as claimed in claim 1, wherein the web has two side portions capable of being bonded to each flange forming member, and each pair of side portions are bonded to a flange forming member with the side portions of each pair being spaced apart.

8. An I-beam structure as claimed in claim 1, wherein the web is formed from two individual truck tire belts.

9. An I-beam structure as claimed in claim 8, wherein the truck tire belts are attached together with mechanical fasteners.

10. An I-beam structure as claimed in claim 8, wherein the truck tire belts are attached together by bonding with adhesive or by vulcanization 11. An I-beam structure as claimed in claim 8, wherein the first and second flange forming members have surfaces for bonding to the side portions of the web, said surfaces being abraded prior to bonding to the web.

12. An I-beam structure as claimed in claim 8, wherein the bonding of the flange forming members to the side portions of the web is accomplished by adhesive or vulcanization.

13. An I-beam structure as claimed in claim 12, wherein the bonding of the flange forming members to the side portions of the web is reinforced with mechanical fasteners.

* * * * *